(12) United States Patent
Zhang

(10) Patent No.: US 11,908,322 B2
(45) Date of Patent: Feb. 20, 2024

(54) SYSTEM AND METHOD OF MANAGING WIRELESS TRAFFIC SIGNALS

(71) Applicant: Ruishi Zhang, Eastvale, CA (US)

(72) Inventor: Ruishi Zhang, Eastvale, CA (US)

( * ) Notice: Subject to any disclaimer, the term of this patent is extended or adjusted under 35 U.S.C. 154(b) by 378 days.

(21) Appl. No.: 17/407,059

(22) Filed: Aug. 19, 2021

(65) Prior Publication Data

US 2023/0066334 A1 Mar. 2, 2023

(51) Int. Cl.
| | | |
|---|---|---|
| G08G 1/00 | (2006.01) | |
| G08G 1/09 | (2006.01) | |
| G08G 1/0967 | (2006.01) | |
| H04W 12/03 | (2021.01) | |
| H04W 4/06 | (2009.01) | |
| H04W 4/44 | (2018.01) | |

(52) U.S. Cl.
CPC ....... *G08G 1/092* (2013.01); *G08G 1/096725* (2013.01); *G08G 1/096783* (2013.01); *H04W 4/06* (2013.01); *H04W 4/44* (2018.02); *H04W 12/03* (2021.01)

(58) Field of Classification Search
CPC ............ G08G 1/092; G08G 1/096725; G08G 1/096783; G08G 1/095; G08G 1/0965; G08G 1/093; G08G 1/096; H04W 4/06; H04W 4/44; H04W 12/03
See application file for complete search history.

(56) References Cited

U.S. PATENT DOCUMENTS

| | | |
|---|---|---|
| 9,142,127 B1 | 9/2015 | McDevitt-Pimbley |
| 9,824,583 B2 | 11/2017 | Popple |
| 2012/0154137 A1* | 6/2012 | Lin .......................... B62J 6/056 340/475 |
| 2019/0066498 A1 | 2/2019 | Baldwin |
| 2020/0341487 A1 | 10/2020 | Hazelton |

OTHER PUBLICATIONS

Eliot, Lance, Traffic Lights and AI Autonomous Cars, AiTrends, https://www.aitrends.com/ai-insider/traffic-lights-and-ai-autonomous-cars/, Aug. 15, 2019.

* cited by examiner

*Primary Examiner* — Ian Jen

(57) ABSTRACT

A system and a method manage wireless traffic signals in order to aid autonomous driving systems and humans to quickly and accurately detect traffic signal changes and surrounding traffic. The system includes a plurality of road vehicles. Each road vehicle includes a vehicle receiver, a vehicle controller, and a vehicle output device. The system also includes a plurality of traffic-signal sources and a plurality of signal emitters. Each signal emitter is associated to a corresponding traffic-signal source from the plurality of traffic-signal sources. Each signal emitter processes traffic signals from the corresponding traffic-signal source and sends the processed traffic signals to the vehicle receivers. The vehicle receivers receive signals from the plurality of signal emitters. The vehicle controller processes the signals received by the vehicle receiver. The vehicle output device executes instructions that are extracted from the signals processed by the vehicle controller.

10 Claims, 14 Drawing Sheets

SYSTEM AND METHOD OF MANAGING WIRELESS TRAFFIC SIGNALS

FIELD OF THE INVENTION

The present invention relates generally to traffic systems. More specifically, the present invention is a system and method of managing wireless traffic signals in order to aid autonomous driving systems and humans to quickly and accurately detect traffic signals changes and surrounding traffic. Therefore, the present invention helps in reducing car accidents.

BACKGROUND OF THE INVENTION

Safety is the top priority for autonomous vehicles. Traffic rules and instructions from authorities including temporary instructions, such as detours, need to be followed. Signal, instructions, and recognition will be a key function for auto pilot vehicles. Currently, weather, buildings, etc. greatly impact the recognition of traffic signals and signs. Blind people also cannot recognize signs and signals. Image recognition systems are widely known as traffic signal recognition systems (TSRS). However, the accuracy of image recognition systems is dramatically impacted by weather, buildings, lighting, etc. Image recognition systems also consume a substantial amount of central processing unit (CPU) usage, memory, and they are costly. Traffic lights and signs can only carry limited information and may not be sufficient for more complex traffic. Digitized signals can be broadcasted to the surrounding area from transmitters via wireless signals and carry more precise information.

It is therefore an objective of the present invention to provide a system and method of managing wireless traffic signals in order to aid autonomous driving systems and humans to quickly and accurately detect traffic signals changes and surrounding traffic. Therefore, the present invention helps in reducing car accidents. The present invention includes a plurality of signal emitters that are associated to a corresponding traffic-signal source from a plurality of signal sources. Each signal emitter broadcasts encrypted traffic instructions to a plurality of road vehicles in order for the each road vehicle to quickly and accurately detect traffic signals changes and surrounding traffic.

DETAIL DESCRIPTIONS OF THE INVENTION

All illustrations of the drawings are for the purpose of describing selected versions of the present invention and are not intended to limit the scope of the present invention.

Figure 1:
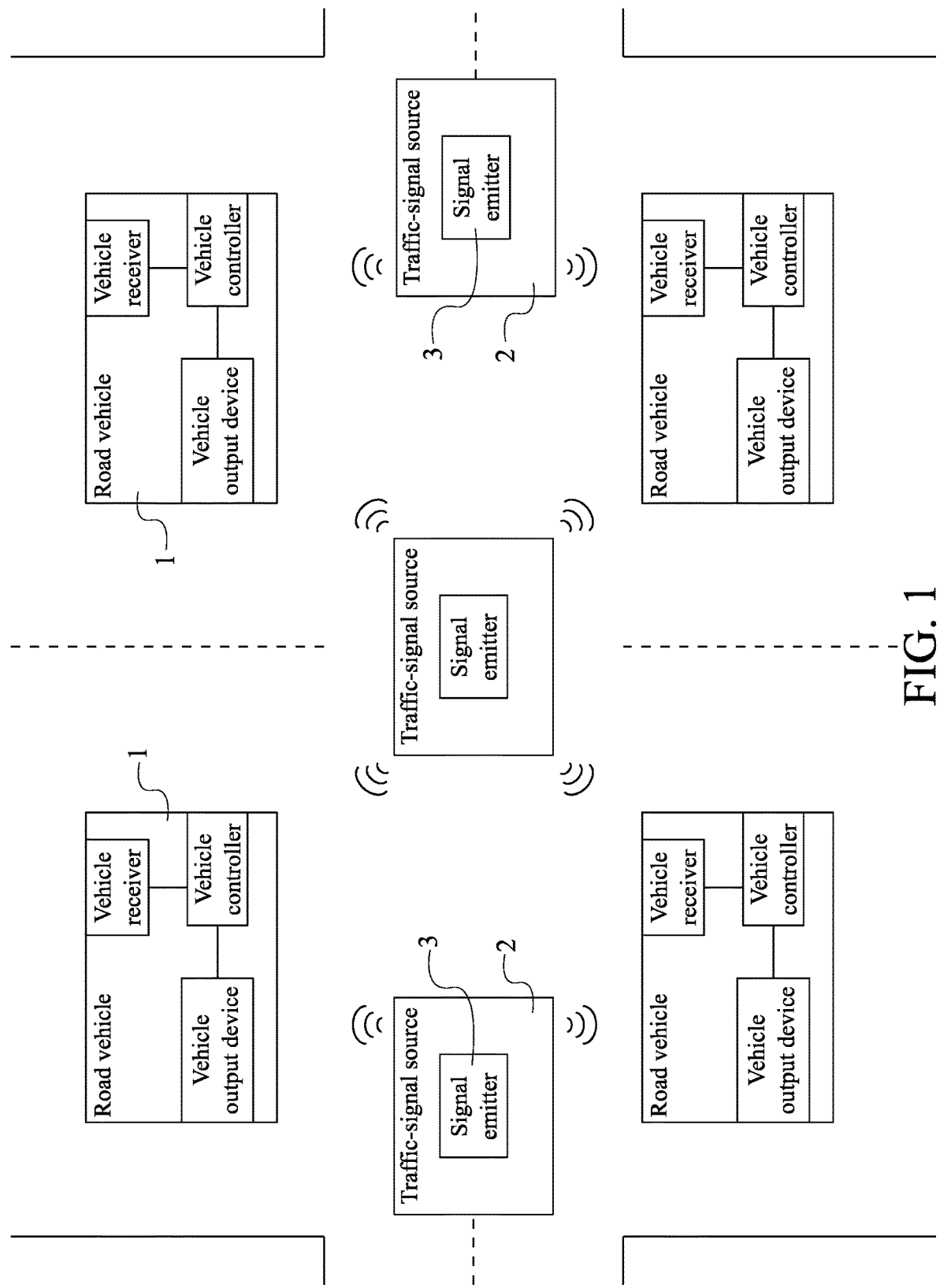
FIG. 1 is a block diagram illustrating the system of the present invention.
Figure 2:
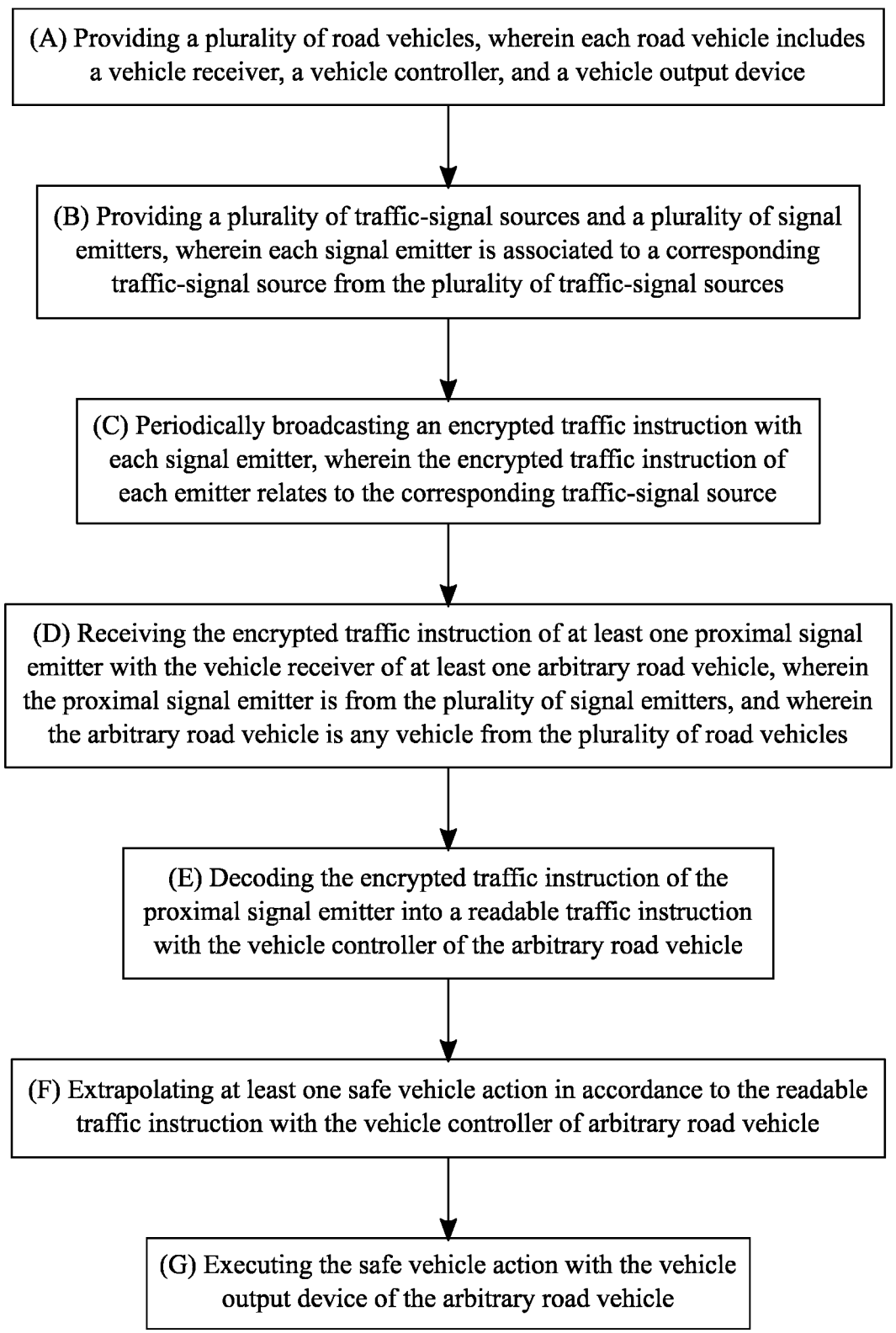
FIG. 2 is a flowchart illustrating the overall process for the method of the present invention.
Figure 13:
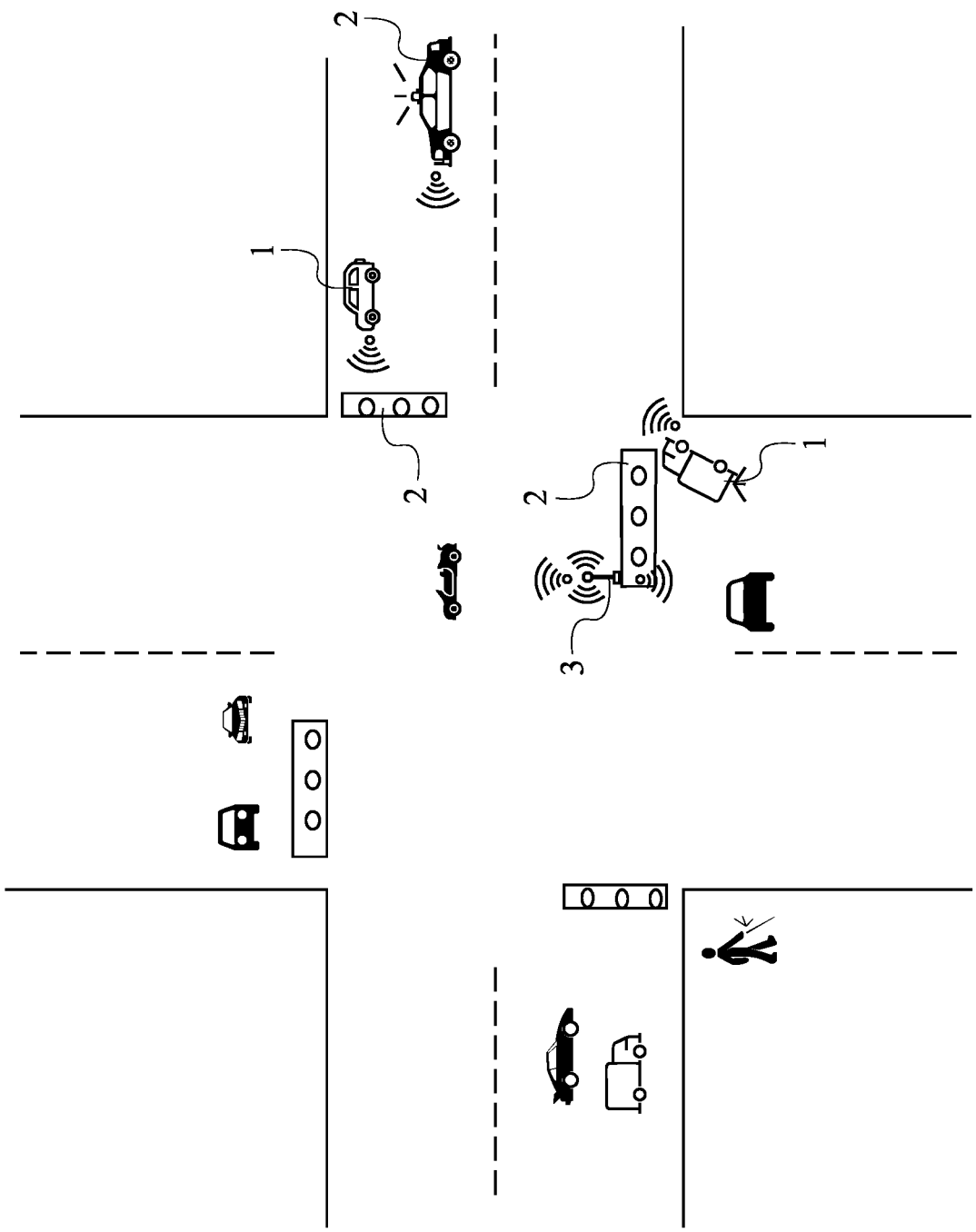
FIG. 13 is an exemplary diagram illustrating the system of the present invention.

In reference to FIGS. 1 through 14, the present invention is a system and method of managing wireless traffic signals in order to aid autonomous driving systems and humans to quickly and accurately detect traffic signal changes and surrounding traffic. Therefore, the present invention helps in reducing car accidents. With reference to FIGS. 1 and 2, the system of the present invention includes a plurality of road vehicles 1 (Step A). Each of the plurality of road vehicles 1 includes a vehicle receiver, a vehicle controller, and a vehicle output device. Each of the plurality of road vehicles 1 may be any vehicle such as, but not limited to, a car, a truck, a van, or a sport utility vehicle. The system also includes a plurality of traffic-signal sources 2 and a plurality of signal emitters 3 (Step B). Each of the plurality of signal emitters 3 is associated to a corresponding traffic-signal source 2 from the plurality of traffic-signal sources 2. The vehicle receiver receives signals from the plurality of signal emitters 3. The vehicle controller processes the signals received by the vehicle receiver. The vehicle output device executes instructions that are extracted from the signals processed by the vehicle controller. With reference to FIG. 13, each of the plurality of traffic-signal sources 2 may be any source that provides traffic signals such as, but not limited, traffic lights, traffic signs, or an authority figure. Each of the plurality of signal emitters 3 processes traffic signals from the corresponding traffic-signal source 2 and sends the processed traffic signals to the vehicle receivers.

The method of the present invention follows an overall process that aids autonomous driving systems and humans to quickly and accurately detect traffic signal changes and surrounding traffic. With reference to FIG. 2, each signal emitter 3 periodically broadcasts an encrypted traffic instruction (Step C). The encrypted traffic instruction of each signal emitter 3 relates to the corresponding traffic-signal source 2. The encrypted traffic instruction may be any traffic information such as, but not limited, a traffic light change, an upcoming road sign or exit, or instructions from an authority figure. The encrypted traffic instruction is encrypted for security purposes and is preferably in JavaScript Object Notation (JSON) format. In more detail, the encryption aspect of the encrypted traffic instruction prevents unwanted sources from sending faulty instructions to the vehicle receivers. The vehicle receiver of at least one arbitrary road vehicle receives the encrypted traffic instruction of at least one proximal signal emitter (Step D). The proximal signal emitter is from the plurality of signal emitters 3 and the arbitrary road vehicle is any vehicle of the plurality of road vehicles 1. The proximal signal emitter is a signal emitter that is in the signal radius of the vehicle receiver of the arbitrary road vehicle. The signal radius can range from 500 feet to 2000 feet dependent on requirements set by government or authority figures. If there is no signal emitter within the signal radius of the vehicle receiver, other detection methods of a road vehicle are used. The vehicle controller of the arbitrary road vehicle then decodes the encrypted traffic instruction of the proximal signal emitter into a readable traffic instruction (Step E). The readable traffic instruction is a set of traffic information that can be read and processed by the vehicle controller. The vehicle controller of the arbitrary road vehicle extrapolates at least one safe vehicle action in accordance to the readable traffic instruction (Step F). The safe vehicle action may be any type of traffic movement such as, but not limited to, stopping when a traffic light is red, accelerating when a traffic light is green, slowing down when a traffic light is yellow, changing lanes, turning at an intersection, or taking a road exit. Finally, the vehicle output device of the arbitrary road vehicle executes the safe vehicle action (Step G). Thus, an autonomous driving system or human can quickly and accurately perform the safe vehicle action dependent on traffic signal changes and surrounding traffic. For example, a human with impaired vision will be aware of traffic signal changes and surrounding traffic in order to quickly and accurately perform the safe vehicle action.

Figure 3:
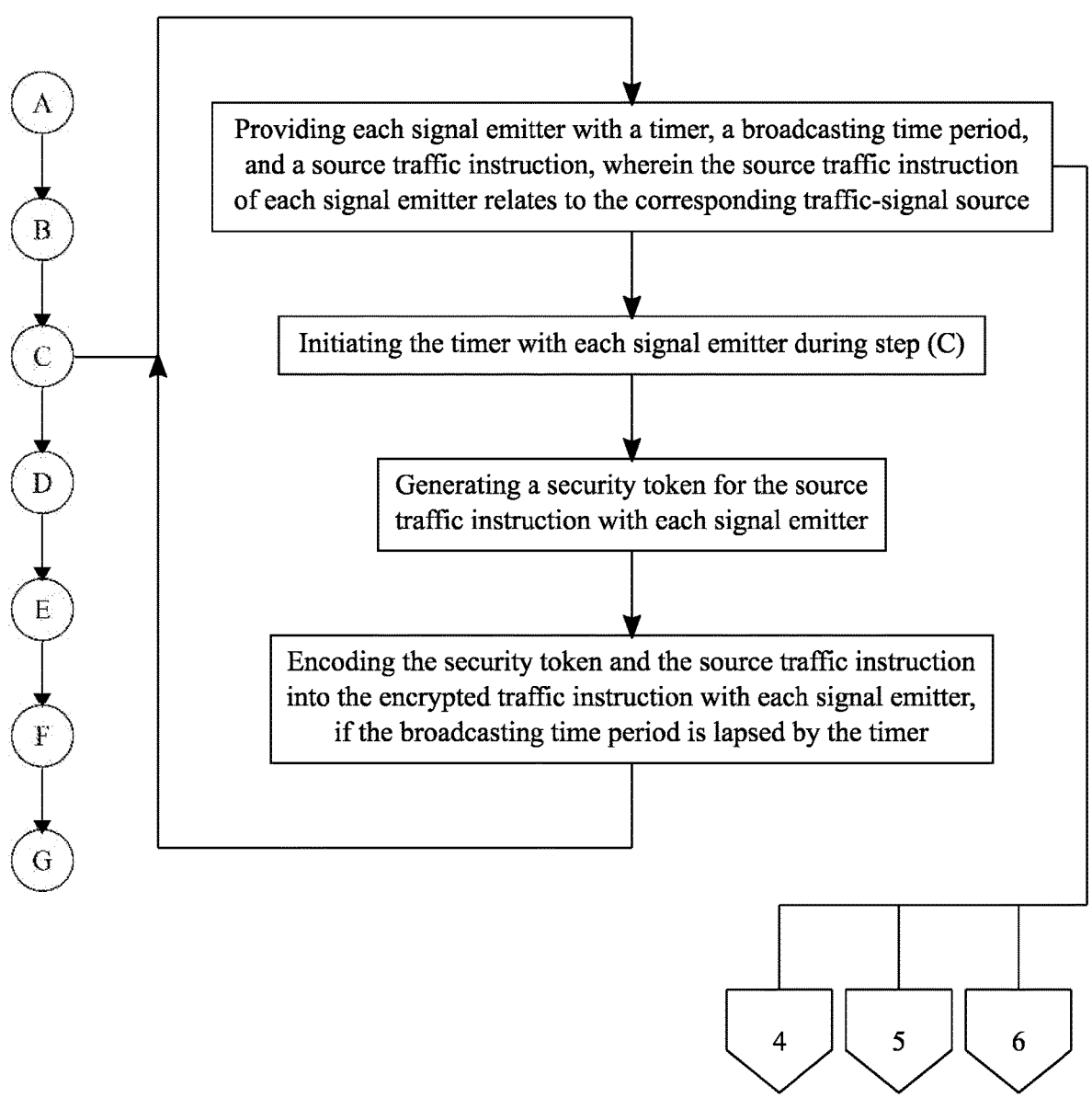
FIG. 3 is a flowchart illustrating the subprocess of encoding the encrypted traffic instruction.

In order for the encrypted traffic instruction to be encoded and with reference to FIG. 3, the following subprocess is executed. Each signal emitter 3 is provided with a timer, a broadcasting time period, and a source traffic instruction. The source traffic instruction of each signal emitter 3 relates to the corresponding traffic-signal source 2. The source traffic instruction is unencrypted information from the corresponding traffic-signal source 2 such as, but not limited to, a traffic light change, an upcoming road sign or exit, and instructions from an authority figure. Each signal initiates a timer during Step C. The timer tracks the time that starts from when the source traffic instruction is received by each signal emitter 3. Each signal emitter 3 generates a security token for the source traffic instruction in preparation to encode the source traffic instruction. The security token is a set of digital information that identifies the characteristics of the source traffic instruction. Each signal emitter 3 encodes the security token and the source traffic instruction into the encrypted traffic instruction, if the broadcasting time is lapsed by the timer. Thus, the encrypted traffic instruction is encoded in order to prevent unwanted sources from sending faulty signals to vehicle receivers.

Figure 4:
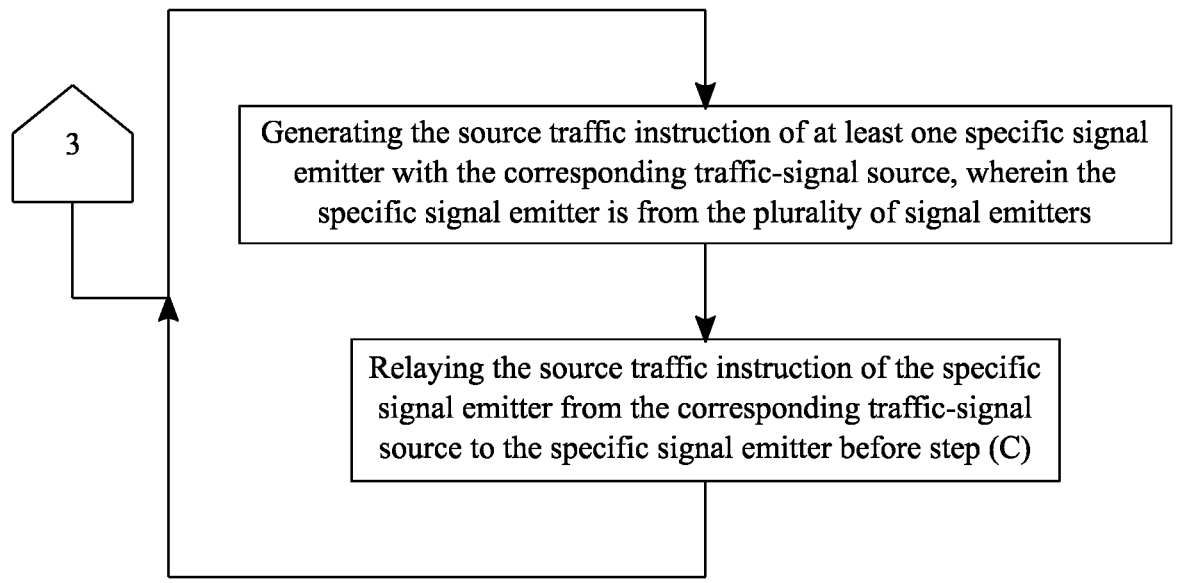
FIG. 4 is a flowchart illustrating the subprocess of receiving the source traffic instruction from a traffic light or traffic sign.

With reference to FIG. 4, the following subprocess is executed when the source traffic instruction is from a traffic light or a traffic sign. The corresponding traffic-signal source 2 generates the source traffic instruction of at least one specific signal emitter. The specific signal emitter is from the plurality of signal emitters 3. When the corresponding traffic-signal source 2 is a traffic light, the source traffic instruction is a traffic light change. When the corresponding traffic-signal source 2 is a traffic sign, the source traffic instruction is a constant notification of information relevant to the traffic sign. The corresponding traffic-signal source 2 relays the source traffic instruction of the specific signal emitter to the specific signal emitter before Step C. In the case where the corresponding traffic-signal source 2 is a traffic light, the corresponding traffic-signal source 2 is connected to the signal emitter 3 by an adapter that allows the communication between the signal emitter 3 and the corresponding traffic-signal source 2. In the case where the corresponding traffic-signal source 2 is a traffic sign, the signal emitter 3 is pre-programmed with information relevant to the traffic sign.

Figure 5:
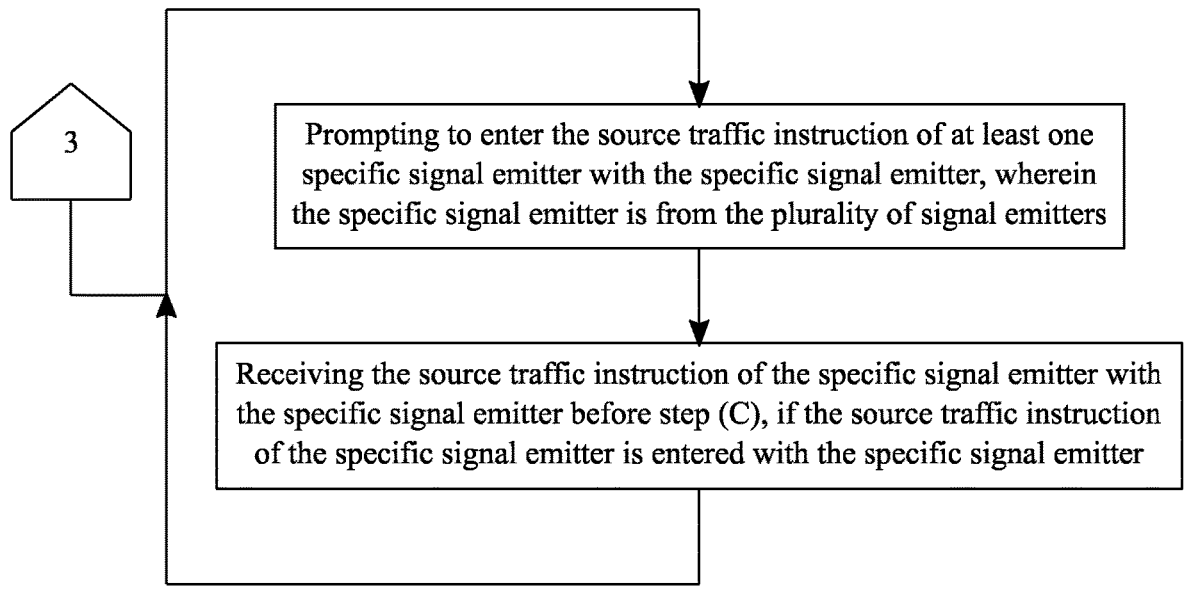
FIG. 5 is a flowchart illustrating the subprocess of receiving the source traffic instruction from an authority figure.

With reference to FIG. 5, the following subprocess is executed when the source traffic instruction is from an authority figure. The specific signal emitter prompts to enter the source traffic instruction of at least one specific signal emitter. The source traffic instruction is from an authority figure and may be any type of instruction such as, but not limited to, pulling over for the authority figure, stopping when a traffic light is green, or accelerating when a traffic light is red. Moreover, the source traffic instruction from an authority figure outranks the source traffic instruction from a traffic light or a traffic sign. The specific signal emitter receives the source traffic instruction of the specific signal emitter before Step C, if the source traffic instruction of the specific signal emitter is entered with the specific signal emitter. Thus, the instructions from the authority figure can be broadcasted to be received by a target road vehicle and/or surrounding road vehicles. Alternatively, the siren system of the authority figure can be connected to the signal emitter 3. This allows the authority figures to relay a pull-over instruction by activating the siren system.

Figure 6:
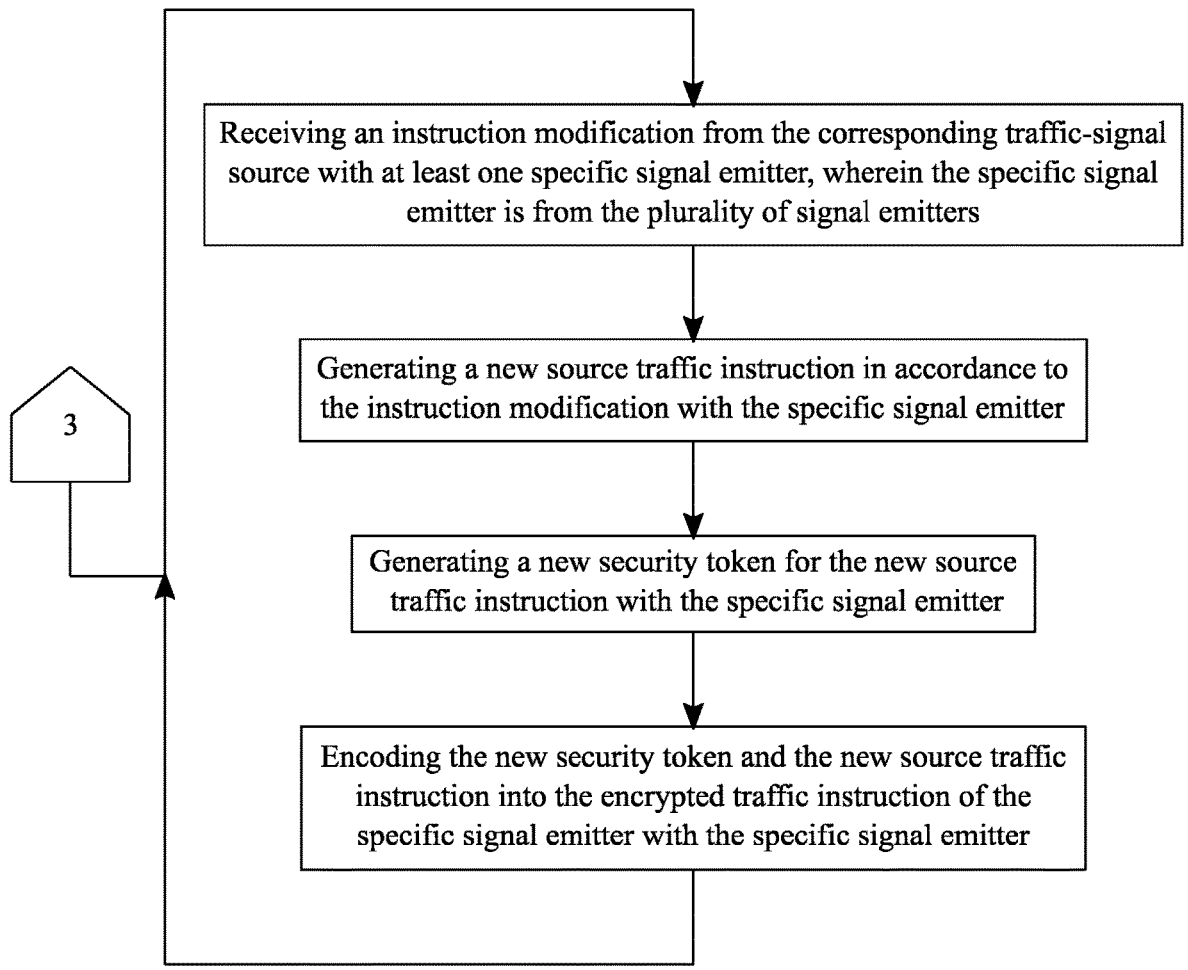
FIG. 6 is a flowchart illustrating the subprocess for a signal emitter to broadcast a new source traffic instruction.

In order for a signal emitter to broadcast a new source traffic instruction and with reference to FIG. 6, the following subprocess is executed. The specific signal emitter receives an instruction modification from the corresponding traffic-signal source 2. The instruction modification may be information such as, but not limited to, a traffic light change, a detour, or further instructions from an authority figure. The specific signal emitter generates a new source traffic instruction in accordance to the instruction modification. The new source traffic instruction is a set of updated information in order for a road vehicle to safely perform a vehicle action. The specific signal emitter also generates a new security token for the new source traffic instruction in preparation to encode the new source traffic instruction. The specific signal emitter encodes the new security token and the new source traffic instruction into the encrypted traffic instruction of the specific signal emitter. Thus, the new source traffic instruction is encoded for security purposes. Moreover, a prepare data process (PDP) ensures that the new source traffic instruction is accurate before the new security token is generated and before the new source traffic instruction is encoded into the encrypted traffic instruction.

Figure 7:
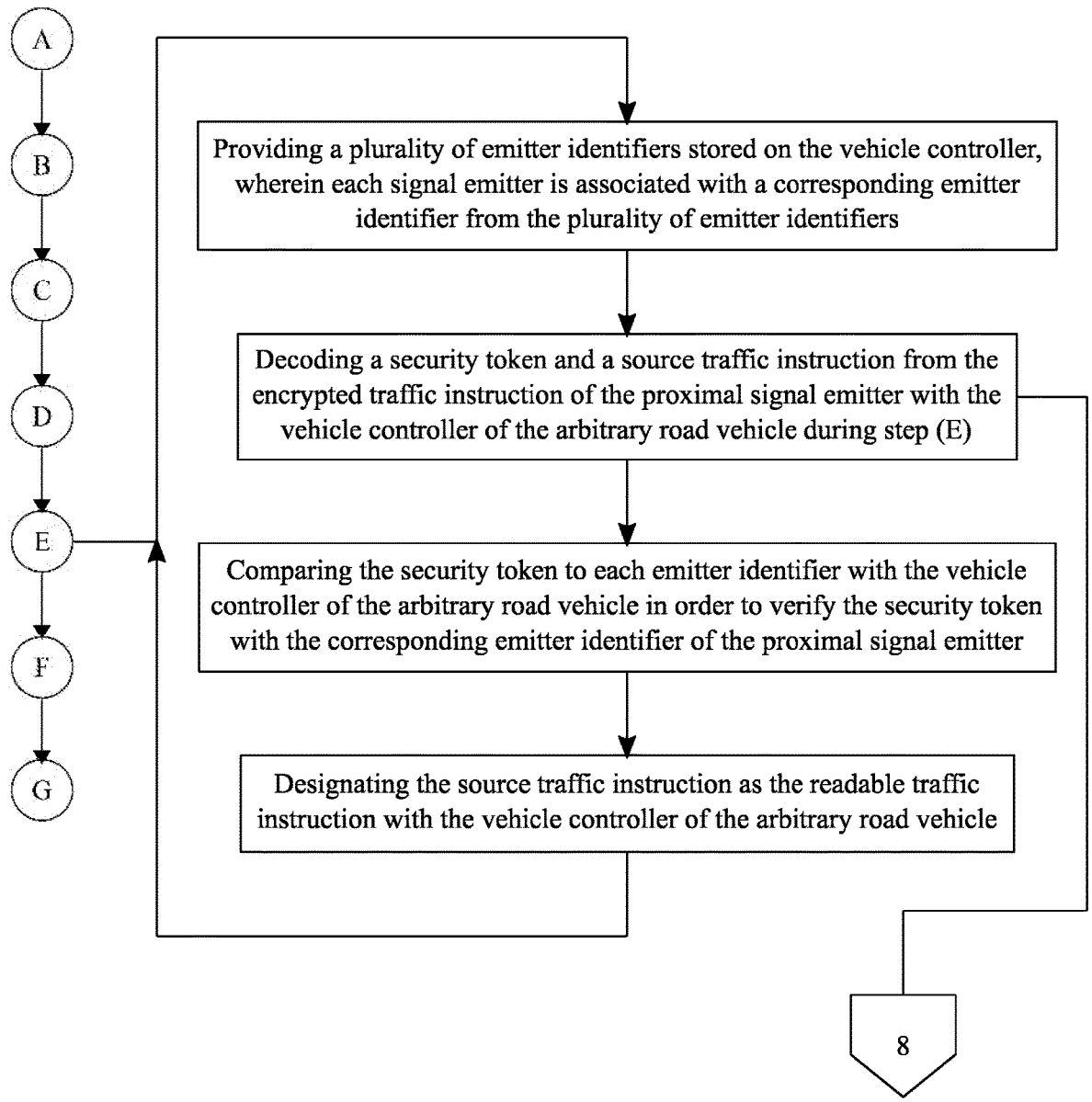
FIG. 7 is a flowchart illustrating the subprocess of decoding the encrypted traffic instruction.

In order for the vehicle controller to decode the encrypted traffic instruction and with reference to FIG. 7, the following subprocess is executed. A plurality of emitter identifiers is stored on the vehicle controller. Each signal emitter 3 is associated with a corresponding emitter identifier from the plurality of emitter identifiers. In more detail, the plurality of emitter identifies is identification information for the plurality of signal emitters 3 in order for the vehicle controllers to verify signals are sent from a legitimate source. The vehicle controller of the arbitrary road vehicle decodes a security token and a source traffic instruction from the encrypted traffic instruction of the proximal signal emitter during Step E. Thus, the vehicle controller can proceed to verify the legitimacy of the encrypted traffic instruction. The vehicle controller of the arbitrary road vehicle compares the security token to each emitter identifier to verify the security token with the corresponding emitter identifier of the proximal signal emitter. Thus, the vehicle controller verifies that the encrypted traffic instruction is not from a faulty source. Finally, the vehicle controller of the arbitrary road vehicle designates the source traffic instruction as the readable traffic instruction in preparation for the vehicle output device to perform the safe vehicle action.

Figure 8:
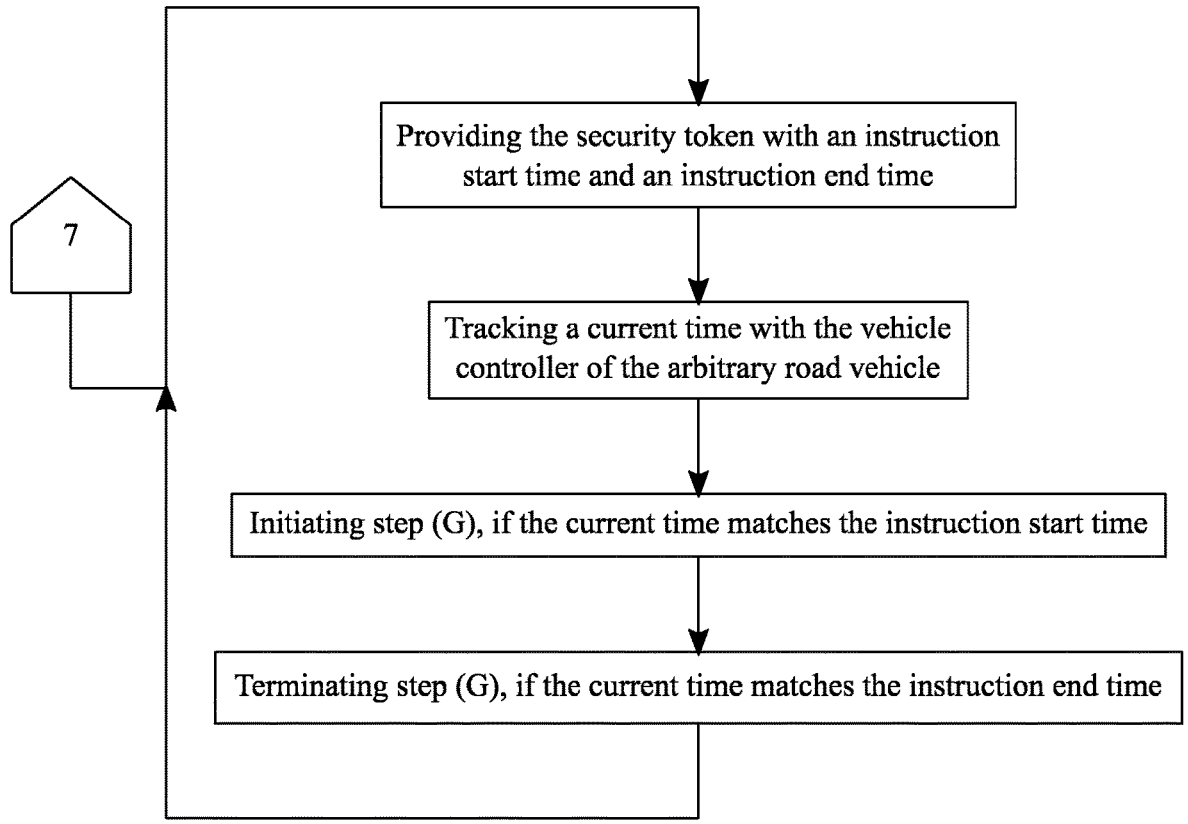
FIG. 8 is a flowchart illustrating the subprocess for the road vehicle to perform the safe vehicle action within a timeframe.

In order for the vehicle output device to precisely perform the safe vehicle action and with reference to FIG. 8, the following subprocess is executed. The security token is provided with an instruction start time and an instruction end time. The instruction start time and the instruction end time give a timeframe in which the safe vehicle action can be performed. The vehicle controller of the arbitrary road vehicle tracks a current time. Step G is initiated, if the current time matches the instruction start time. In more detail, the vehicle output device begins to perform the safe vehicle action at the instruction start time. Step G is terminated, if the current time matches the instruction end time. In more detail, the vehicle output device finishes the safe vehicle action at the instruction end time.

Figure 9:
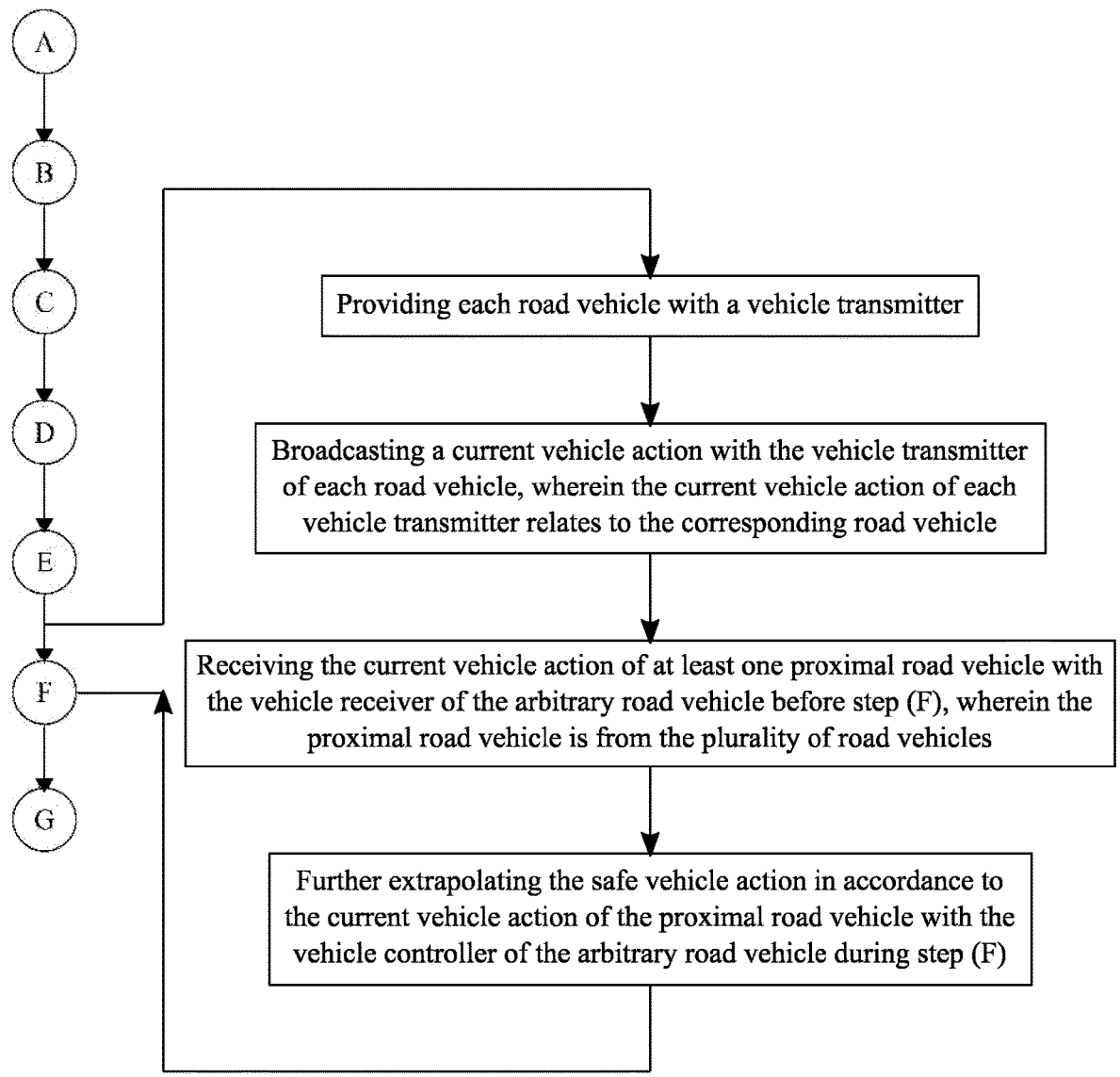
FIG. 9 is a flowchart illustrating the subprocess for autonomous road vehicles or humans to quickly and accurately detect surrounding traffic.
Figure 10:
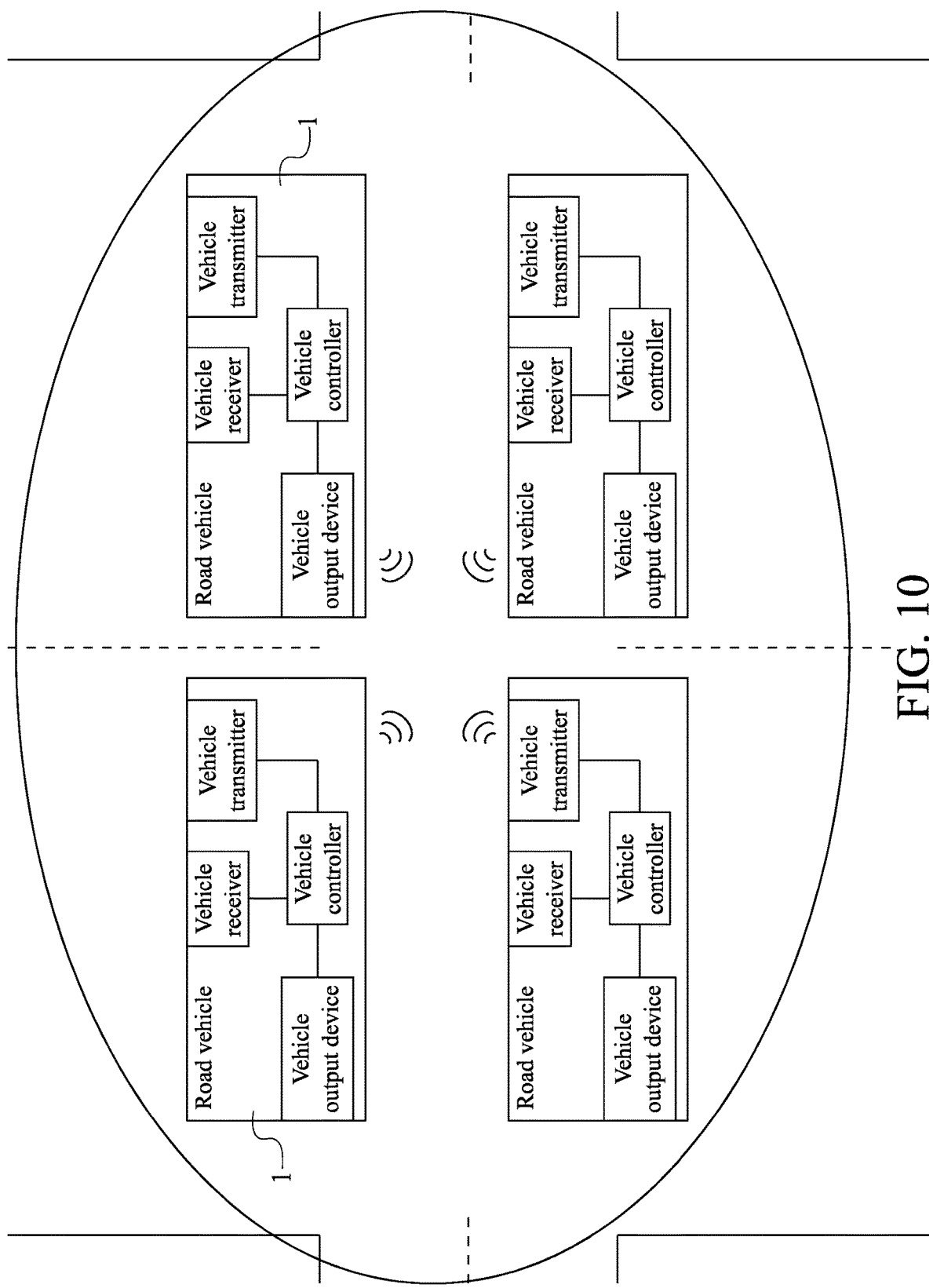
FIG. 10 is a block diagram illustrating road vehicles broadcasting safe vehicle actions with an associated vehicle transmitter.
Figure 14:
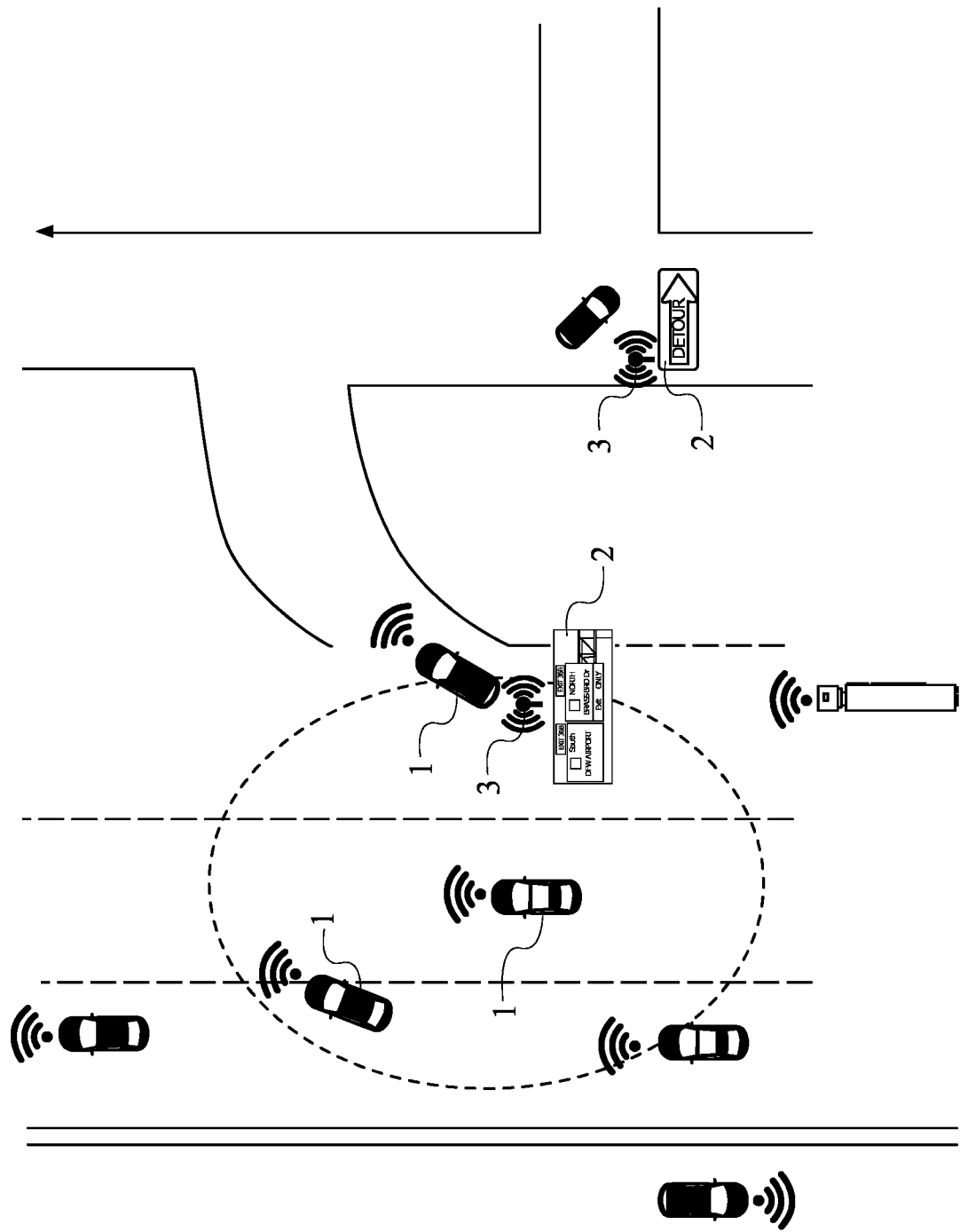
FIG. 14 is another exemplary diagram illustrating the system of the present invention.

In order for an autonomous road vehicle or a human to quickly and accurately detect surrounding traffic and with reference to FIGS. 9, 10, and 14, the following subprocess is executed. Each road vehicle 1 is provided with a vehicle transmitter. The vehicle transmitter allows a road vehicle to broadcast a signal when the road vehicle is performing a safe vehicle action. The vehicle transmitter of each road vehicle 1 broadcasts a current vehicle action. The current vehicle action of each vehicle transmitter relates to the corresponding road vehicle. In more detail, the current vehicle action is an action that a road vehicle is performing such as, but not limited to, slowing down, stopping, making a turn, or changing lanes. The vehicle receiver of the arbitrary road vehicle receives the current vehicle action of at least one proximal road vehicle before Step F. The proximal road vehicle is from the plurality of road vehicles 1. The proximal road vehicle is a road vehicle within a scope radius of the arbitrary road vehicle. In more detail, the vehicle receiver of the arbitrary road vehicle receives signals from surrounding road vehicles and filters out signals that are not within the scope radius of the arbitrary road vehicle. The vehicle controller of the arbitrary road vehicle further extrapolates the safe vehicle action in accordance to the current vehicle action of the proximal road vehicle during Step F. In more detail, the vehicle controller of the arbitrary road vehicle combines all the signals received from the proximal road vehicles and the signals received from the proximal signal emitters 3 in order to identify the most safe and effective safe vehicle action.

Figure 11:
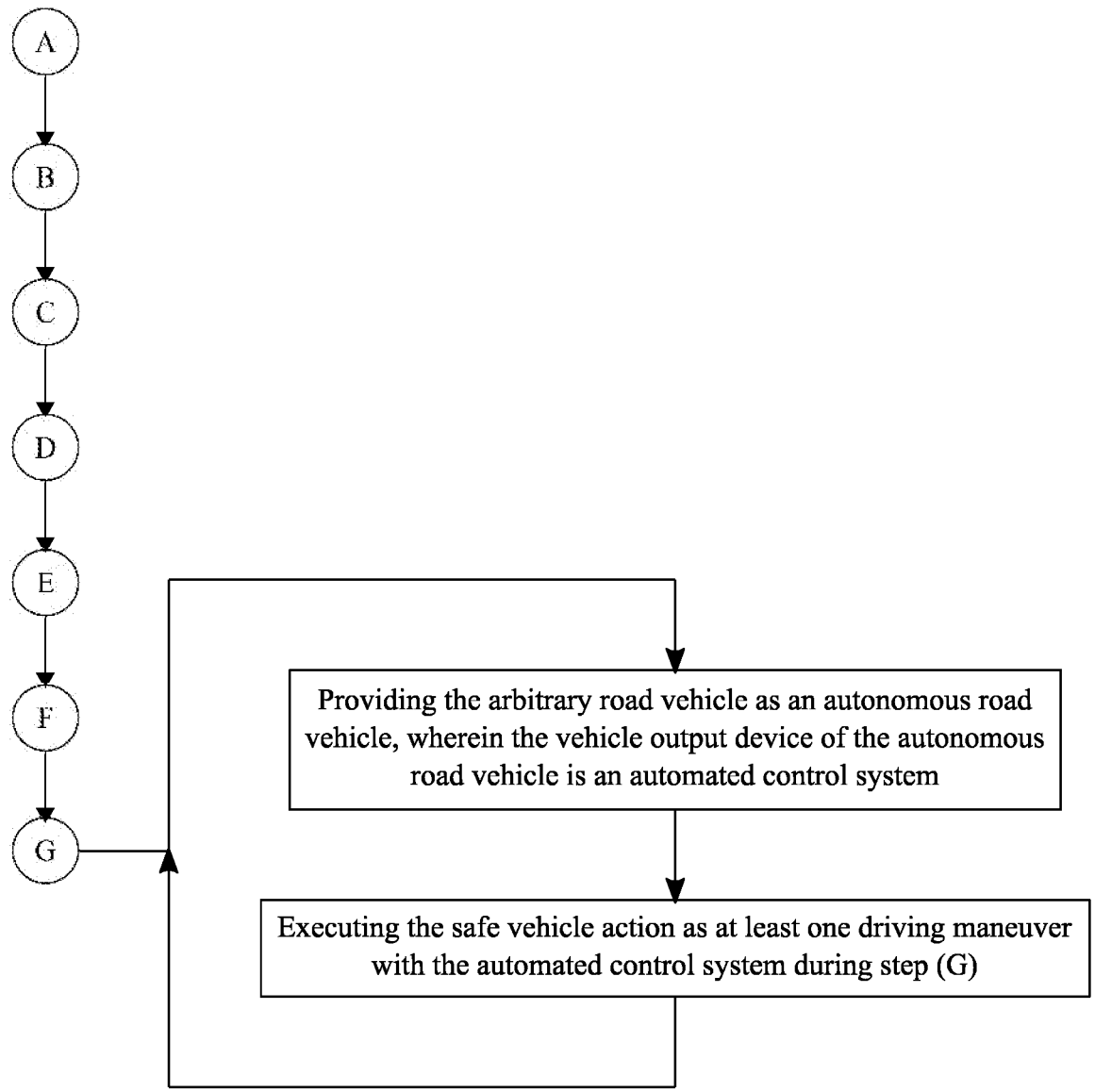
FIG. 11 is a flowchart illustrating the subprocess of executing the safe vehicle action as at least one driving maneuver.
Figure 12:
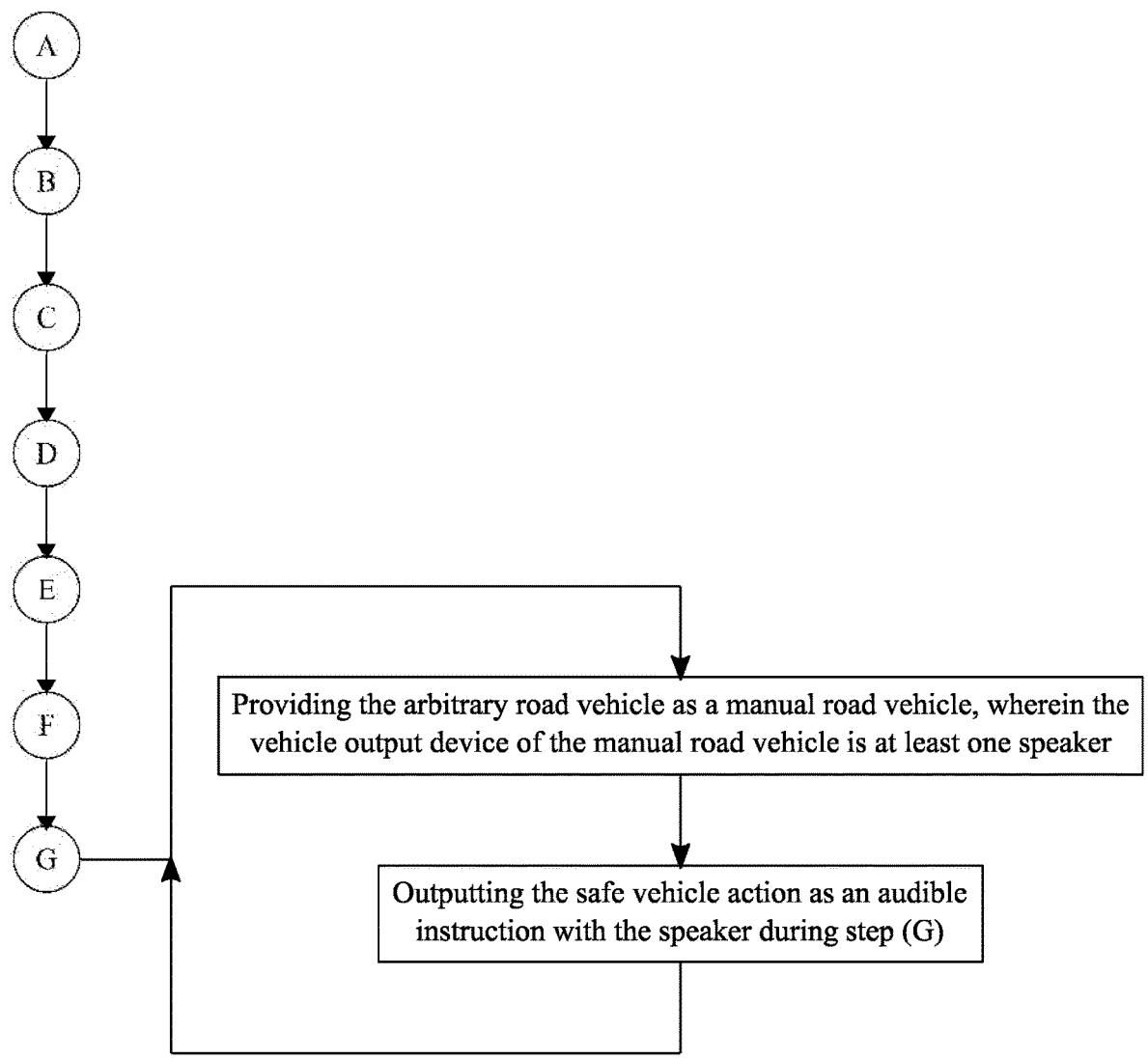
FIG. 12 is a flowchart illustrating the subprocess of executing the safe vehicle action as an audible instruction.

When the arbitrary road vehicle is provided as an autonomous road vehicle and with reference to FIG. 11, the following subprocess is executed. The vehicle output device of the autonomous road vehicle is an automated control system. The automated control system executes the safe vehicle action as at least one driving maneuver during Step G. The driving maneuver can be any vehicle maneuver such as, but not limited, slowing down, stopping, making a turn, or changing lanes. In more detail, the present invention aids the automated control system to detect traffic signal changes and surrounding traffic in order to safely perform driving maneuvers. Alternatively and with reference to FIG. 12, when the arbitrary road vehicle is provided as a manual road vehicle, the following subprocess is executed. The vehicle output device of the manual road vehicle is at least one speaker. The speaker outputs the safe vehicle action as an audible instruction during Step G. In more detail, the speaker may be an external audio speaker, a pair of earphones, or a headset that provides driving instructions to the driver of the manual road vehicle. Thus, humans, especially those are vision impaired, can detect traffic signal changes and surrounding traffic in order to safely perform driving maneuvers.

Each of the plurality of signal emitters 3 can be provided with a weatherproof cover, an adapter, at least one solar panel, and an antenna. The weatherproof cover conceals and protects the signal emitter 3. The adapter allows the signal emitter 3 to be connected to a traffic light or control system of an authority vehicle. The solar panel allows the signal emitter 3 to be powered and charged by sunlight, and thus, the signal emitter 3 will require only a small amount of energy maintenance. The antenna allows the signal emitter 3 to emit signals in a large coverage area.

Supplemental Description

As mentioned previously, the encrypted traffic instruction is preferably in JSON format. Examples of encrypted traffic instructions in JSON format are below:

a. Traffic lights:
{
  "Emitter ID" : "ABCD1234",
  "Token" : "ABCD1234",
  "Type" : "Traffic light",
  "Time" : 20210109200000000000,
  "Signals" :[
    "Targets" :{
      "Target cars" :[
        "Car" :{
          "Plat Number" : "All"
        }
      ],
      "Direction" :{
        "Street" : "Main street",
        "Heading" : "Northeast",
        "Turning" : "Left turn"
      },
      "Signal" : "Green",
      "Instruction" : "Allow traffic"
    },
    "Targets" :{
      "Target cars" :[
        "Car" :{
          "Plat number" : "All"
        }
      ]
      "Direction" :{
        "Street" : "1$^{st}$ street",
        "Heading" : "West",
        "Turning" : "Non-turning"
      },
      "Signal" : "Red",
      "Instruction" : "Stop"
    }
  ]
}
b. Road instructions:
{
  "Emitter ID" : "ABCD1234",
  "Token" : "ABCD1234",
  "Type" : "Traffic sign",
  "Time" : 20210109200000000000,
  "Signals" :[
    "Targets" :{
      "Target cars" :[
        "Car" :{
          "Plat Number" : "All"
        }
      ],
      "Direction" :{
        "Street" : "Main street",
        "Heading" : "Northeast",
        "Turning" : "Left turn"
      },
      "Signal" : "Stop sign",
      "Instruction" : "Stop and go"

```
    }
  ]
}
c. Temporary signals:
{
    "Emitter ID" : "ABCD1234",
    "Token" : "ABCD1234",
    "Type" : "Traffic sign",
    "Time" : 20210109200000000000,
    "Signals" :[
        "Targets" :{
            "Target cars" :[
                "Car" :{
                    "Plat Number" : "All"
                }
            ],
            "Direction" :{
                "Street" : "Vermont street",
                "Heading" : "15 North",
            },
            "Detour" : "Main street",
            "Instruction" : "Use main street"
            "Description" : "Construction"
        }
    ]
}
d. Authority's signal:
{
    "Emitter ID" : "ABCD1234",
    "Token" : "ABCD1234",
    "Type" : "Traffic sign",
    "Time" : 20210109200000000000,
    "Signals" :[
        "Targets" :{
            "Target cars" :[
                "Car" :{
                    "Plat Number" : "8N58888"
                    "Action" : "Pull over"
                },
                "Car" :{
                    "Plat Number" : "Other"
                    "Action", "Yield"
                }
            ],
            "Direction" :{
                "Street" : "Vermont street",
                "Heading" : "15 North",
            },
            "Detour" : "Main street",
            "Instruction" : "Use main street"
            "Description" : "Construction"
        }
    ]
}
e. Car changing signals:
{
    "Emitter ID" : "ABCD1234",
    "Token" : "ABCD1234",
    "Type" : "Traffic sign",
    "Time" : 20210109200000000000,
    "Signals" :[
        "Signal" :{
            "Type" : "Changing",
            "Turn" : "Left"
        }
    ]
}
f. Car ping signals:
{
    "Emitter ID" : "ABCD1234",
    "Token" : "ABCD1234",
    "Type" : "Traffic sign",
    "Time" : 20210109200000000000,
    "Signals" :[
        "Signal" :{
            "Type" : "Ping",
```
```
            "Position" : "33.947140, -117.599737"
        }
    ]
}
```

Although the invention has been explained in relation to its preferred embodiment, it is to be understood that many other possible modifications and variations can be made without departing from the spirit and scope of the invention as hereinafter claimed.

What is claimed is:

1. A method of managing wireless traffic signals, the method comprises the steps of:
   (A) providing a plurality of road vehicles, wherein each road vehicle includes a vehicle receiver, a vehicle controller, and a vehicle output device;
   (B) providing a plurality of traffic-signal sources and a plurality of signal emitters, wherein each signal emitter is associated to a corresponding traffic-signal source from the plurality of traffic-signal sources;
   (C) periodically broadcasting an encrypted traffic instruction with each signal emitter, wherein the encrypted traffic instruction of each emitter relates to the corresponding traffic-signal source;
   (D) receiving the encrypted traffic instruction of at least one proximal signal emitter with the vehicle receiver of at least one arbitrary road vehicle, wherein the proximal signal emitter is from the plurality of signal emitters, and wherein the arbitrary road vehicle is any vehicle from the plurality of road vehicles;
   (E) decoding the encrypted traffic instruction of the proximal signal emitter into a readable traffic instruction with the vehicle controller of the arbitrary road vehicle;
   (F) extrapolating at least one safe vehicle action in accordance to the readable traffic instruction with the vehicle controller of arbitrary road vehicle; and
   (G) executing the safe vehicle action with the vehicle output device of the arbitrary road vehicle.

2. The method of managing wireless traffic signals as claimed in claim 1, the method comprises the steps of:
   providing each signal emitter with a timer, a broadcasting time period, and a source traffic instruction, wherein the source traffic instruction of each signal emitter relates to the corresponding traffic-signal source;
   initiating the timer with each signal emitter during step (C);
   generating a security token for the source traffic instruction with each signal emitter; and
   encoding the new security token and the new source traffic instruction into the encrypted traffic instruction of the specific signal emitter with the specific signal emitter, if the broadcasting time period is lapsed by the timer.

3. The method of managing wireless traffic signals as claimed in claim 2, the method comprises the steps of:
   generating the source traffic instruction of at least one specific signal emitter with the corresponding traffic-signal source, wherein the specific signal emitter is from the plurality of signal emitters; and
   relaying the source traffic instruction of the specific signal emitter from the corresponding traffic-signal source to the specific signal emitter before step (C).

4. The method of managing wireless traffic signals as claimed in claim 2, the method comprises the steps of:
   prompting to enter the source traffic instruction of at least one specific signal emitter with the specific signal emitter, wherein the specific signal emitter is from the plurality of signal emitters; and receiving the source traffic instruction of the specific signal emitter with the specific signal emitter before step (C), if the source traffic instruction of the specific signal emitter is entered with the specific signal emitter.

5. The method of managing wireless traffic signals as claimed in claim 2, the method comprises the steps of:

receiving an instruction modification from the corresponding traffic-signal source with at least one specific signal emitter, wherein the specific signal emitter is from the plurality of signal emitters;

generating a new source traffic instruction in accordance to the instruction modification with the specific signal emitter;

generating a new security token for the new source traffic instruction with the specific signal emitter; and encoding the new security token and the new source traffic instruction into the encrypted traffic instruction of the specific signal emitter with the specific signal emitter.

6. The method of managing wireless traffic signals as claimed in claim 1, the method comprises the steps of:

providing a plurality of emitter identifiers stored on the vehicle controller, wherein each signal emitter is associated with a corresponding emitter identifier from the plurality of emitter identifiers;

decoding a security token and a source traffic instruction from the encrypted traffic instruction of the proximal signal emitter with the vehicle controller of the arbitrary road vehicle during step (E);

comparing the security token to each emitter identifier with the vehicle controller of the arbitrary road vehicle in order to verify the security token with the corresponding emitter identifier of the proximal signal emitter; and designating the source traffic instruction as the readable traffic instruction with the vehicle controller of the arbitrary road vehicle.

7. The method of managing wireless traffic signals as claimed in claim 6, the method comprises the steps of:

providing the security token with an instruction start time and an instruction end time;

tracking a current time with the vehicle controller of the arbitrary road vehicle;

initiating step (G), if the current time matches the instruction start time; and terminating step (G), if the current time matches the instruction end time.

8. The method of managing wireless traffic signals as claimed in claim 1, the method comprises the steps of:

providing each road vehicle with a vehicle transmitter;

broadcasting a current vehicle action with the vehicle transmitter of each road vehicle, wherein the current vehicle action of each vehicle transmitter relates to the corresponding road vehicle;

receiving the current vehicle action of at least one proximal road vehicle with the vehicle receiver of the arbitrary road vehicle before step (F), wherein the proximal road vehicle is from the plurality of road vehicles; and further extrapolating the safe vehicle action in accordance to the current vehicle action of the proximal road vehicle with the vehicle controller of the arbitrary road vehicle during step (F).

9. The method of managing wireless traffic signals as claimed in claim 1, the method comprises the steps of:

providing the arbitrary road vehicle as an autonomous road vehicle, wherein the vehicle output device of the autonomous road vehicle is an automated control system; and executing the safe vehicle action as at least one driving maneuver with the automated control system during step (G).

10. The method of managing wireless traffic signals as claimed in claim 1, the method comprises the steps of:

providing the arbitrary road vehicle as a manual road vehicle, wherein the vehicle output device of the manual road vehicle is at least one speaker; and outputting the safe vehicle action as an audible instruction with the speaker during step (G).

* * * * *